United States Patent
Arnold (10) Patent No.: US 7,419,522 B2
(45) Date of Patent: Sep. 2, 2008

(54) DIRT SEPARATION AND COLLECTION ASSEMBLY FOR VACUUM CLEANER

(75) Inventor: Adrian Christopher Arnold, Brentor (GB)

(73) Assignee: Euro-Pro Operating, LLC, West Newton, MA (US)

(*) Notice: Subject to any disclaimer, the term of this patent is extended or adjusted under 35 U.S.C. 154(b) by 361 days.

(21) Appl. No.: 11/083,481

(22) Filed: Mar. 18, 2005

(65) Prior Publication Data

US 2006/0207231 A1  Sep. 21, 2006

(51) Int. Cl.
*B01D 45/12* (2006.01)
(52) U.S. Cl. .............................. 55/345; 55/424; 55/429; 55/433; 55/DIG. 3; 15/350; 15/353
(58) Field of Classification Search .................. 55/337, 55/346, 349, 429, 459.1, 486, 345, 424, 433, 55/DIG. 3, 350, 353
See application file for complete search history.

(56) References Cited

U.S. PATENT DOCUMENTS 4,853,010 A * 8/1989 Spence et al. .................. 96/52

2002/0020154 A1 * 2/2002 Yang ........................... 55/337

FOREIGN PATENT DOCUMENTS

WO  WO 02/069778  9/2002

* cited by examiner

*Primary Examiner*—Robert A Hopkins
(74) *Attorney, Agent, or Firm*—Greenberg Traurig, LLP; Michael I. Wolfson (57) ABSTRACT

A dirt separation and collection assembly suitable for use in a bagless vacuum cleaner including two dirt separation and collection zones is provided. Dirty air enters the upper portion of a container and enters a first stage dirt separation zone including a disruptor ring extending inwardly from the outer wall to allow coarse dirt particles and fibers to pass through and collect at the base of the outer wall of the device. The spinning air is then drawn through a conical shroud and fed into a second stage conical separator for separating fine dirt particles and collecting them in an inner substantially cylindrical collection chamber. Air exits the conical separator at the opposite cone opening before being drawn to the suction source. Elements may be oriented upwardly or downwardly depending upon the configuration of the housing for receiving the dirt separation and collection assembly.

12 Claims, 7 Drawing Sheets

DIRT SEPARATION AND COLLECTION ASSEMBLY FOR VACUUM CLEANER

BACKGROUND OF THE INVENTION

This invention relates to dirt separation and collection devices and, more particularly to a vacuum cleaner including a dirt cyclonic separation and collection assembly having a first separation zone with a decoupling ring for separating and collecting coarse dirt particles and a second stage separating zone including a frusto-conical cyclone for separating and collecting fine dirt particles.

Cyclonic vacuum cleaners have been known for some time. For example, European Patent No. EP 0 042 723 and U.S. Pat. No. 4,593,429 to James Dyson disclose a vacuum suction cleaning device including two cyclone units in series operating successively to extract dirt particles from an air flow. One of the two cyclones has a substantially frusto-conical shape serving to increase the velocity of the dirt particles so that the cyclone is capable of depositing the fine dust particles in a small diameter collection chamber relative to the diameter of the cone opening. Prior to the air entering the cyclone, dirty air enters tangentially against the wall of a cylindrical outer chamber operating as a cyclone to remove coarse dirt particles from the dirty air entering the device.

In addition to devices wherein the successive cyclones are coaxial as in the above noted publications, Dyson in U.S. Pat. No. 4,373,288 places frusto-conical cyclones side by side. In this configuration, the device is designed to remove dirt through the two cyclones operating in series. The principal objective in all these devices is to avoid the need to utilize a bag as in conventional vacuum cleaners. In these conventional devices, air is drawn through the appliance by a fan that creates a large pressure drop as the bag fills with dirt. This increase in pressure drop lowers the cleaning efficiency of the unit. It is for this reason that configurations for bagless vacuum cleaners are extremely appealing.

A bagless cleaning device is disclosed in WO 99/42198 based on PCT/GB99/00507 by the applicant herein. The full text of this publication is incorporated herein by reference. In this device dirty inlet air is passed into the upper portion of a cyclone having a cylindrical cross-section and a lower frusto-conical section. This cyclone separation stage is designed to separate fine dirt particles in a collection chamber below the cone opening. The cylindrical portion of the device includes a transition zone connected to an adjacent side chamber for collection of coarse dirt particles. In another embodiment disclosed therein, coarse dirt is collected in an outer larger cylindrical chamber surrounding the inner frusto-conical cyclone separator.

Other bagless vacuum cleaner designs are shown in a series of related applications that issued to Royal Appliance Mfg. Co. based on an application that initially issued as U.S. Pat. No. 6,003,196 on Dec. 21, 1999. These patents disclose various types of upright vacuum cleaners including an air separation chamber that may be a cyclonic separation device. All the vacuum cleaners described in these patents include a filter disposed in the cyclonic air flow chamber or dirt cup upstream of the suction source.

U.S. Pat. No. 6,192,550 to Sanyo Electric Co., Ltd. also discloses a vacuum cleaning device having a rotatable filter disposed in a cyclonic air separation chamber. This device is particularly effective, because the rotatable feature of the filter allows removal of dirt entrained in the filter into the bottom of the dirt cup for easy disposal when the dirt cup is removed for cleaning. The contents of this patent are incorporated herein by reference.

While many of these bagless designs are improvements over conventional vacuums utilizing bag technology, it remains desirable to provide continued improvements and alternative designs to improve the separation of dirt particles from air without the need to include filters in the air separator chamber or in the dirt cup.

SUMMARY OF THE INVENTION

Generally speaking, in accordance with the invention, a dirt separation and collection assembly for a vacuum cleaner including a first substantially cylindrical separation zone with a decoupling ring is provided. The separation and collection assembly has an elongated cylindrical container including the cylindrical separation zone with an inlet at the upper region and a decoupling ring or short section of an inverted frusto-conical cone positioned mid-way down the container wall at the lower and of the separation zone. A second stage fine dust separating cyclone maybe coaxially mounted within the cylindrical container with a conical shroud surrounding the cone to allow air to travel to the large cone opening. The cylindrical separator removes coarse dirt particles from the dirty inlet air before the air is fed into the fine dirt cyclone separator.

Dirty air enters tangentially into the interior of the upper portion of the air separation zone and travels down the container wall until the air reaches the decoupling ring. Here, the air is directed off the inner wall and passes through a conical shroud disposed about the inner conical cyclone. Coarse dirt and fibrous materials pass through the space between the decoupling ring and shroud. Dirt removed from the air flow is deposited in the bottom of the container. Air then enters the larger cone opening to the interior of the inner conical separator wherein fine dirt particles are removed through the smaller cone opening at the opposite end and clean exhaust air is withdrawn at the center of the larger cone opening.

Accordingly, it is an object of the invention to provide an improved dirt separation and collection assembly for a vacuum cleaner that provides greater dirt separation over existing designs.

It is another object of the invention to provide a dirt separation container including a cylindrical separator with a decoupling ring or inverted conical section mounted on the inner wall of the container.

It is a further object to the invention to provide a separation and collection container having a second stage fine frusto-conical separation disposed coaxially within the cylindrical container.

Yet another object of the invention is to provide a dirt separation container including a frusto-conical shroud with holes about an inner cyclonic separator for directing air to the large cone opening of the conical separator.

Still another object of the invention is to provide a shroud for dirt separation container including a plurality of holes angled in the direction of air flow about the shroud.

Still other objects and advantages of the invention will in part be obvious and will in part be apparent from the specification.

The invention accordingly comprises the features of construction, combination(s) of elements, and arrangement of parts which will be exemplified in the construction(s) hereinafter set forth, and the scope of the invention will be indicated in the claims.

BRIEF DESCRIPTION OF THE DRAWINGS

For a fuller understanding of the invention, reference is had to the following description taken in connection with the accompanying drawing(s), in which.

DESCRIPTION OF THE PREFERRED EMBODIMENTS

Figure 1:
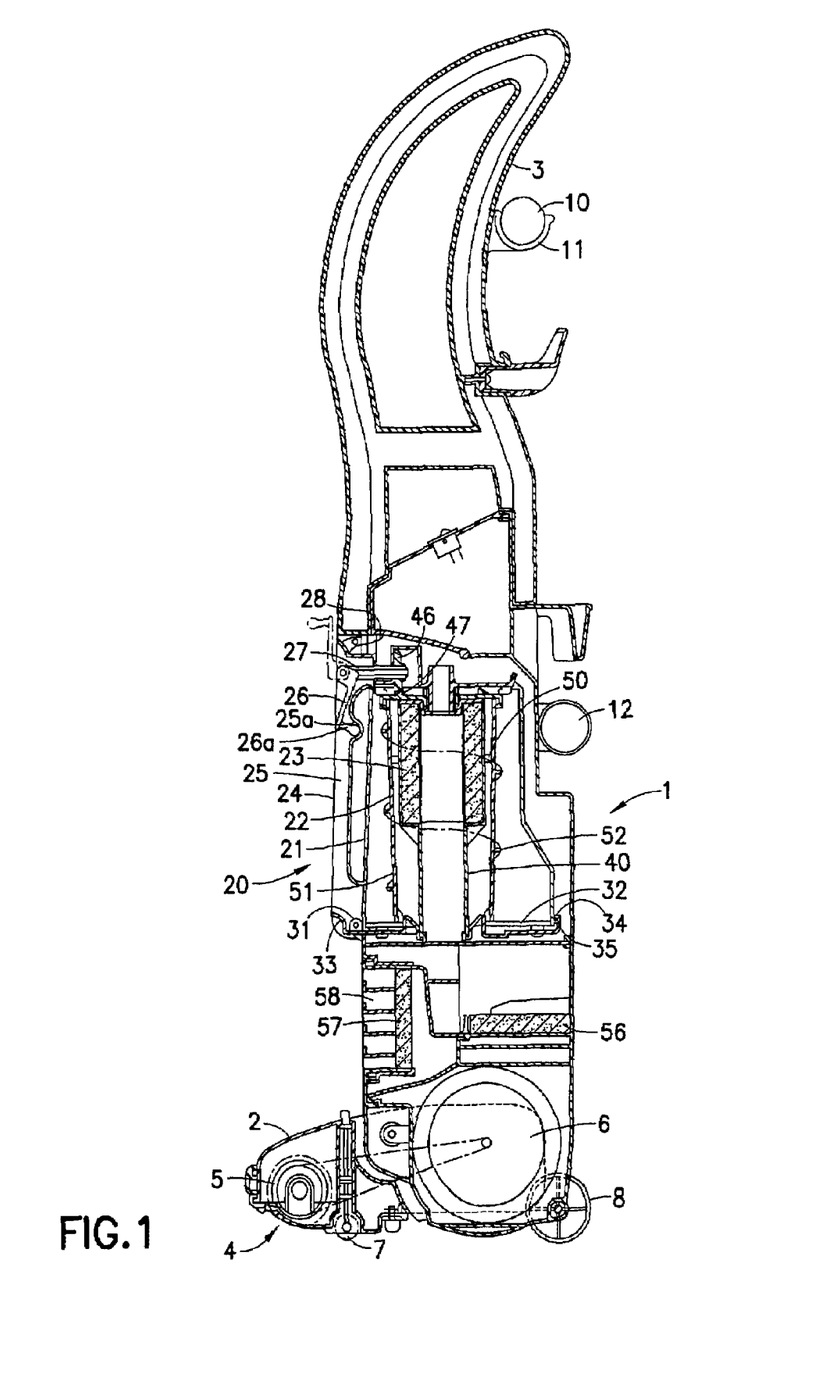
FIG. 1 is a side sectional view of an upright vacuum cleaner of the type disclosed in the prior art including a filter within a removable cylindrical cyclonic air separation and collection chamber.
Figure 2:
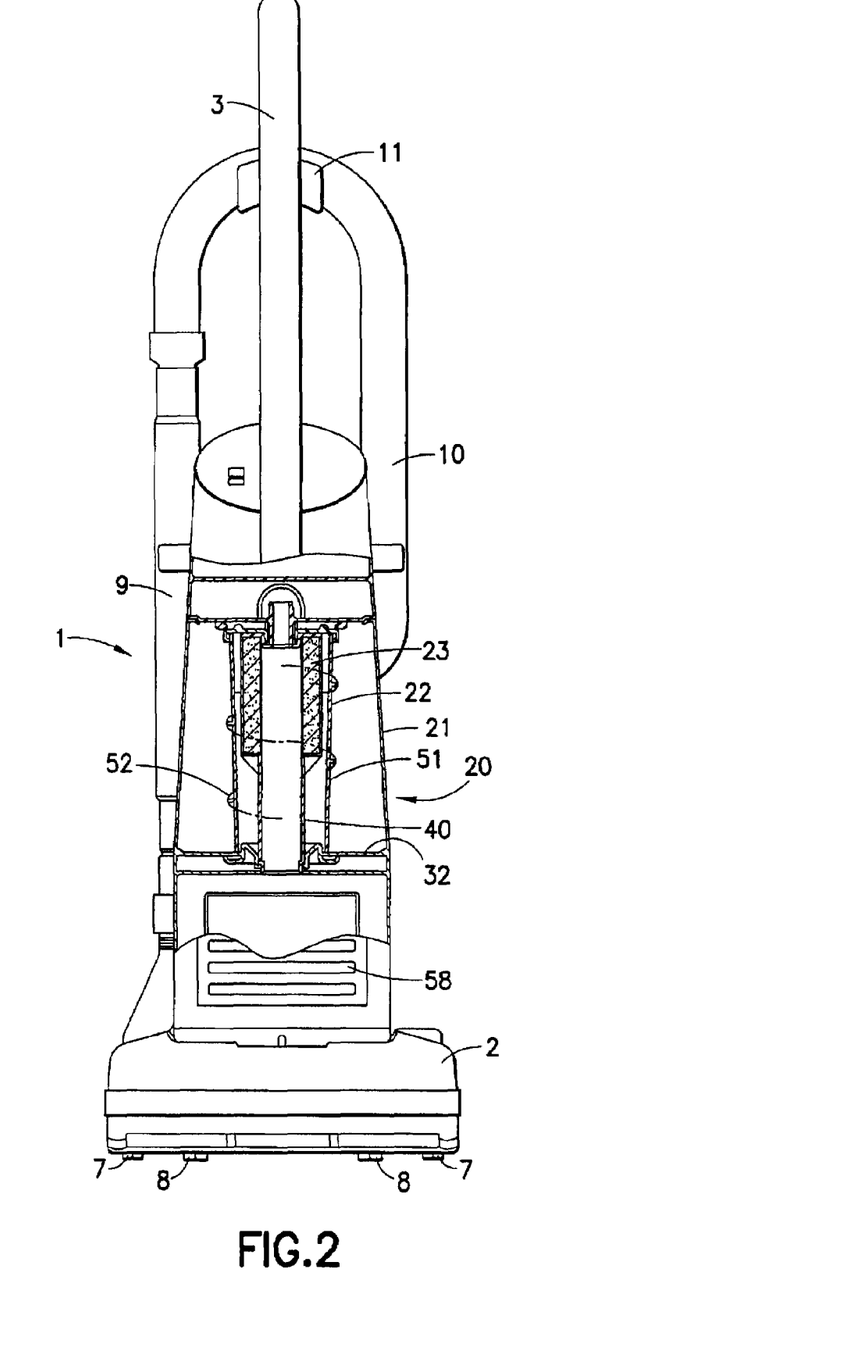
FIG. 2 is a front sectional view of the upright vacuum cleaner illustrated in FIG. 1.

FIGS. 1 and 2 illustrate a side sectional view and a front sectional view of the upright vacuum cleaner of the type shown in U.S. Pat. No. 6,192,550, the disclosure of which is incorporated herein by reference. Here, a suction nozzle 2 for floors is formed at a lower portion of a main body 1 of the vertical type vacuum cleaner with a handle 3 for operating main body 1 at an upper portion thereof, all of which are formed in an uniform manner.

Suction nozzle 2 for floors has a suction inlet 4 at a bottom surface side and further incorporates therein a rotating brush 5 to face suction inlet 4. Rotating brush 5 is connected to a rotating shaft of a motor fan 6 that is incorporated in the lower portion of main body 1 to be driven in a rotating manner. A pair of laterally arranged front wheels 7 are attached frontward of the bottom surface of suction nozzle 2 for floors, while a pair of laterally arranged rear wheels 8 are attached rearward of a lower portion of main body 1.

A pipe 9 is attached on either side of the suction nozzle 2 for floors that communicates with suction inlet 4. Pipe 9 extends upward along main body 1 to a tip end portion of a hose 10 in a freely attachable and detachable manner. Hose 10 is disposed to the rear surface side of the main body 1 by means of a holding portion 11 arranged on a rear surface side of the handle 3 for operating the main body and is connected to a suction cylinder 12 which is formed to be shifted to either side with respect to a center of the rear surface side.

A dust-collecting device (dust-collecting unit) 20 is fitted to a central portion on the front surface side of the main body 1 of the vacuum cleaner in a freely attachable and detachable manner. Dust-collecting device 20 includes cylindrical pre-filter 22 made of transparent resin or the like fitted into the interior of a substantially cylindrical dust-collecting case 21 made of transparent resin or the like, with a substantially cylindrical main filter 23 inside of pre-filter 22.

Dust-collecting case 21 is provided with a grip 24 at a central portion on a side that faces to the front when being attached to main body 1. Grip 24 is so arranged as to extend in a longitudinal direction in a successive manner downward to handle 3 for operating main body 1 with a groove 25 is formed on a surface of the grip 24.

A handle 26 is rotatable for rotating the pre-filter 22 that is attached to an upper side of grip 24 in such a manner that it is freely foldable in a transverse direction with respect to a rotating axis 27 thereof. Handle 26 can be accumulated in groove 25 of grip 24 while a knob 26a of handle 26 is fitted to a concave portion 25a formed in groove 25 of grip 24 to be fixed thereat. It is possible to discharge dust accumulated within dust-collecting case 21 by holding grip 24, and the handle 26 can also be accumulated by efficiently utilizing the grip 24 which is not needed at the time of performing cleaning.

A clamp 28 is engaged with main body 1 when dust-collecting device 20 is fitted to main body 1 is provided on an upper side of the handle 26 of the dust-collecting device 20.

A bottom lid 32 is attached which is arranged to be freely openable and closeable by a hinge 31 provided in a lower portion of grip 24. Bottom lid 32 is so arranged that by pushing a lever 33 provided in a lower portion of the grip 24, a clamp 34 formed on an opposing side of the dust-collecting case 21 to be connected to the lever 33 is disengaged from an engaging jaw 35 to thereby release a discharge outlet 36 for the dust.

A spiral rib 52 is formed as to extend in vertical directions on an outer periphery of the pre-filter 22. The spiral rib 52 is disposed about pre-filter 22 so that dust which has accumulated and compressed within dust-collecting case 21 is pushed out in a direction of the discharge outlet when bottom lid 32 is opened for rotating the filter is rotated in a rightward direction.

Air that has been filtered of dust within dust-collecting device 20 exits through the aperture on the lower portion side of cylindrical body 40 of main filter 23 to the exterior of dust-collecting case 21. Filter air is taken in by motor fan 6 via a filter 56 shown in FIG. 1 to be exhausted through an exhaust outlet 58 formed on a lower portion of a front surface of main body 1 to the exterior by being passed from motor fan 6 through an exhaust filter 57.

Dust which has been scraped up by rotating brush 5 of the suction nozzle 2 for floors passes through pipe 9 and hose 10 into dust-collecting case 21 through suction cylinder 12 located to be shifted in either direction with respect to a center of the rear surface side of main body 1 and is made to flow downward by being revolved along the inner wall thereof while large-sized dirt particles (coarse dirt) are deposited on the bottom.

Mesh 51 of pre-filter 22 for sucking air is formed to be located downward within dust-collecting case 21. Dust that has entered together with air through suction hole 30 located upward within the dust-collecting case 21 is pushed downward by being revolved at a high speed so as to be deposited on the bottom surface (bottom lid 32) of dust-collecting case 21 in a pressed condition.

Further, small-sized dust particles (minute dust) enters into pre-filter 22 by passing through mesh 51 arranged in the lower portion of pre-filter 22 and is filtered by the pleat-like main filter 23. Thus, only clean air enters main filter 23 to flow downward through the motor fan 6 to be finally exhausted through the exhaust outlet 58 to the exterior.

Discharge of dust which has been accumulated in the dust-collecting case 21, by holding grip 24 of dust-collecting case 21 and drawing the case out with pushing an operating portion of clamp 28 disposed above the grip 24 upward, the dust-collecting case 21 is detached from the main body 1 of the vacuum cleaner.

By pushing a lever 33 provided in the lower portion of the dust-collecting case 21, clamp 34 is detached whereby bottom lid 32 is released to enable discharge of dust that has been accumulated in dust-collecting case 21. At this time, especially flock-like dust adheres to the inner wall of dust-collecting case 21 in a compressed state so that dust does not easily come off as it is. Thus, handle 26 is rotated in a specified direction (in this case in a rightward direction) for rotating pre-filter 22 in a specified direction whereby spiral rib 52 provided on outer periphery of pre-filter 22 acts to push out dust such as flock-like dust in a compressed state so that easy discharge is enabled.

Figure 3:
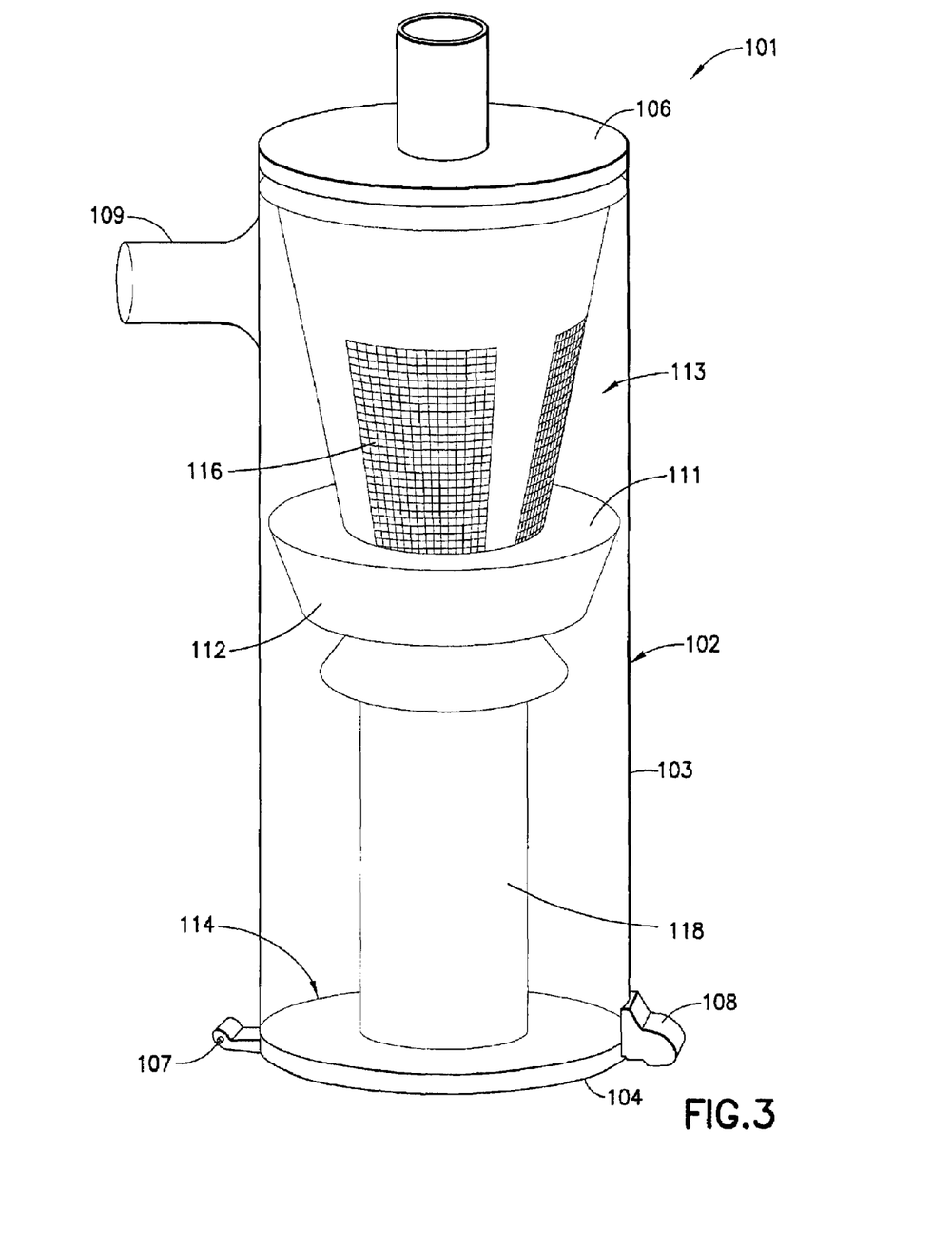
FIG. 3 is a perspective view of a dirt separation and collection assembly with a clear substantially cylindrical side wall with an inverted disrupter ring constructed and arranged in accordance with the invention.
Figure 4:
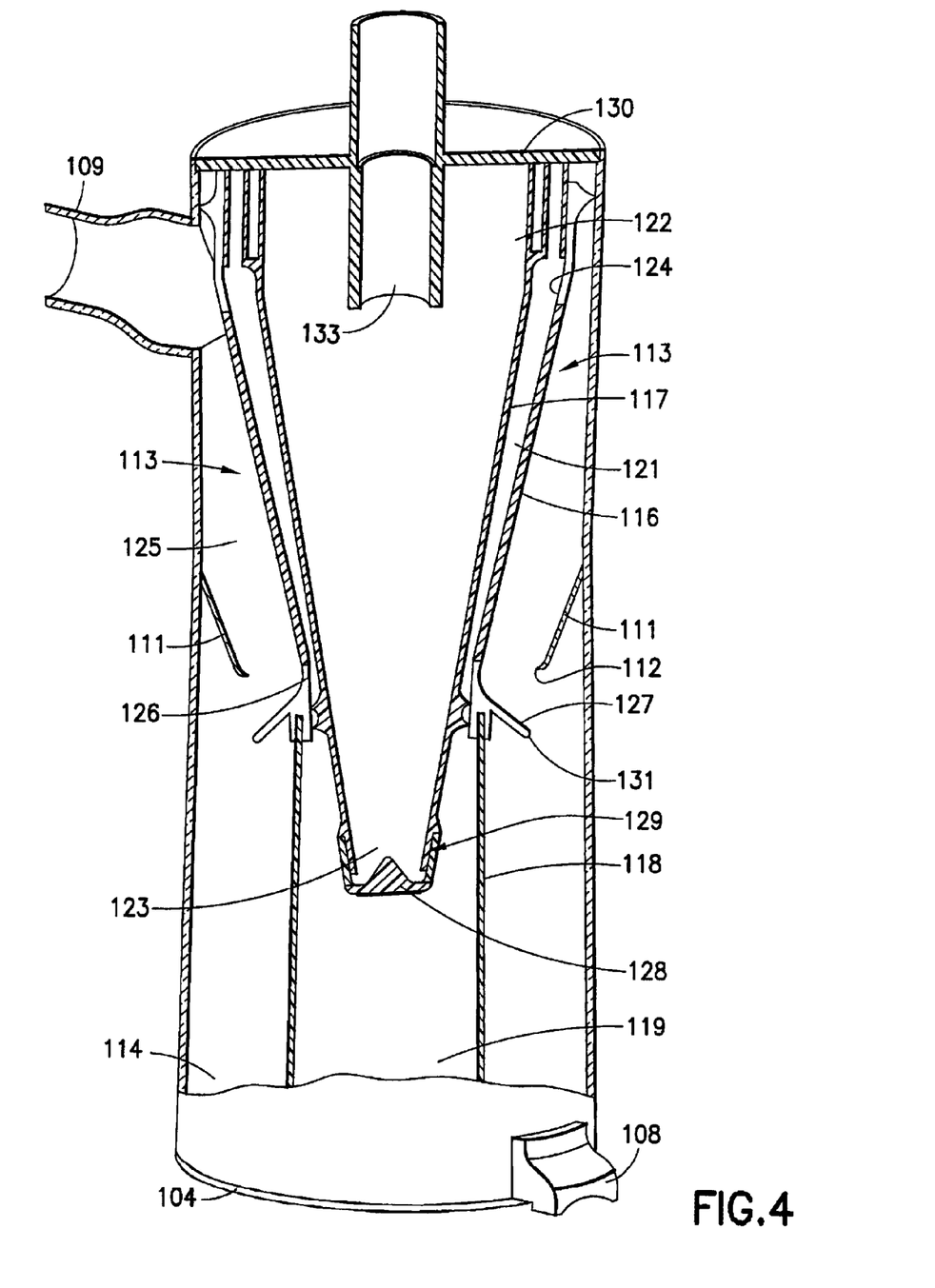
FIG. 4 is a sectional view of the air separation and collection assembly of FIG. 3.
Figure 5:
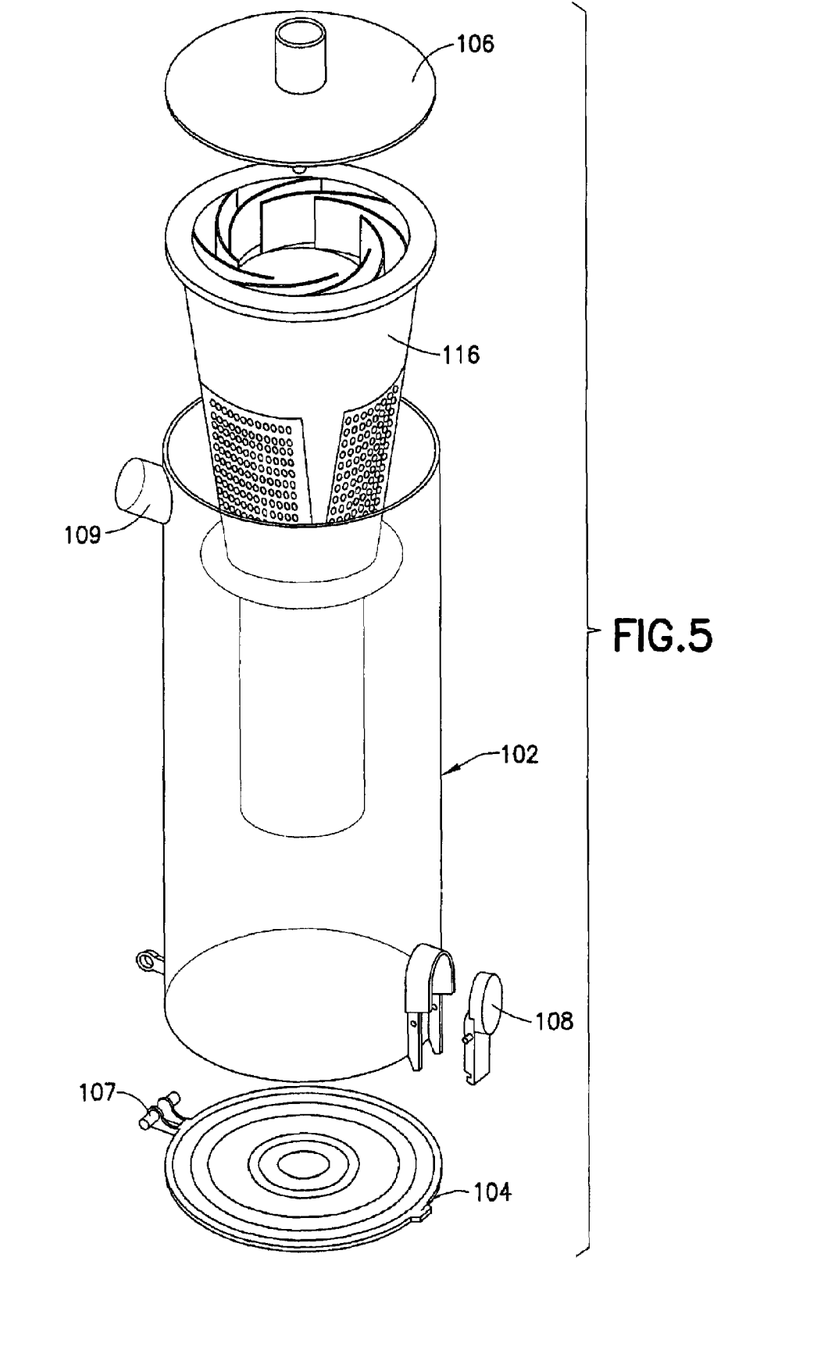
FIG. 5 is an exploded view of the elements of the dirt separation and collection assembly of FIGS. 3 and 4.
Figure 6:
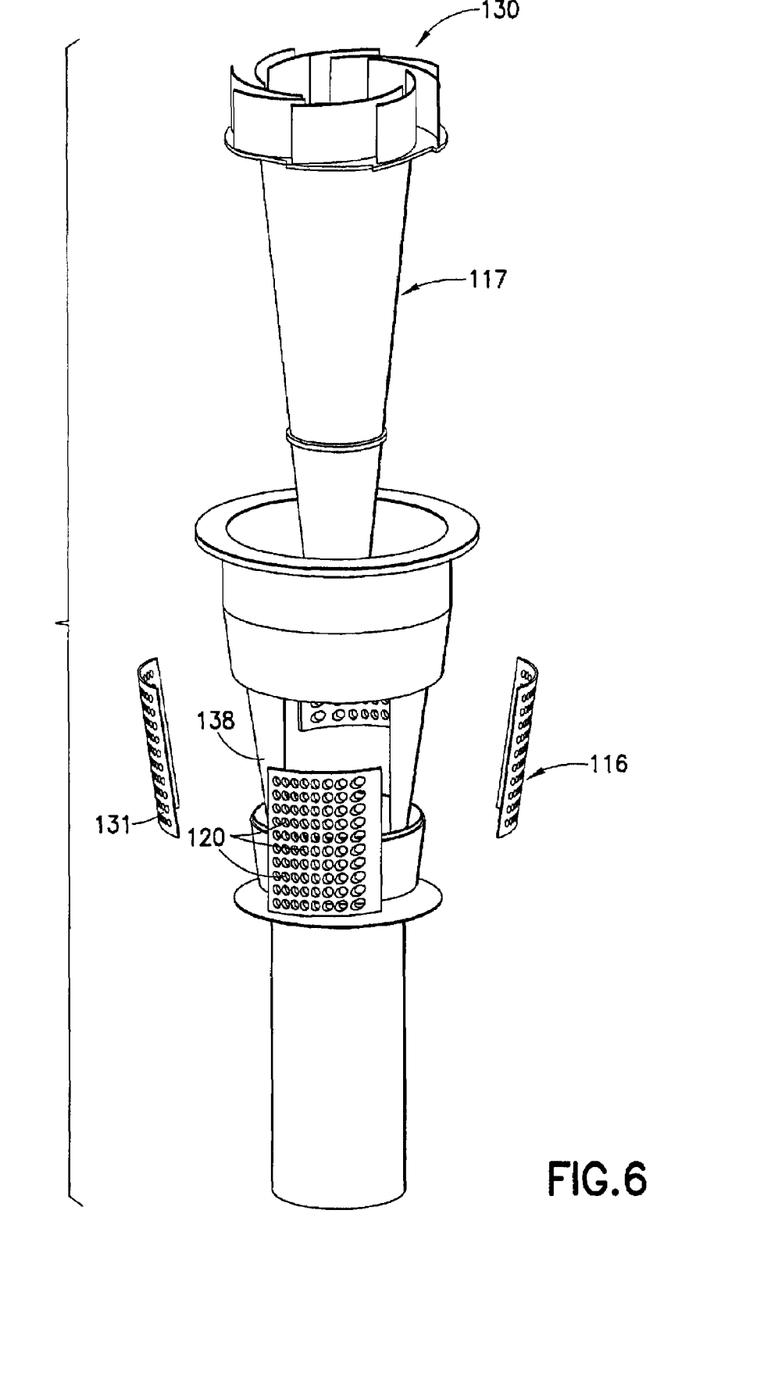
FIG. 6 is an exploded view of the shroud and fine dirt separation assembly of FIGS. 3-5.

In an effort to eliminate the need for a filter in the air separation and collection chamber in the type of upright vacuum shown in FIGS. 1 and 2, a dirt separation and collection assembly 101 as shown FIG. 3 constructed in accordance with the invention may be substituted for dust collecting case 21 in a vacuum cleaner, such as main body 1. The individual elements in dirt separation and collection assembly 101 are shown in FIGS. 4-6.

Referring now to FIG. 3, dirt separation and collection assembly 101 includes a cylindrical container 102 formed with a substantially cylindrical sidewall 103, a selectively openable bottom 104 and a cover 106. Bottom 104 is secured to sidewall 103 by a hinge 107 and is opened by a latch 108 for cleaning in the same manner as described in connection with the vacuum cleaner of FIGS. 1 and 2. A dirty air inlet 109 is provided at the upper portion of sidewall 103.

A decoupler or disrupter ring 111 is positioned on the inside of sidewall 103 about mid-way along its height. Ring 111 is in the form of a short inverted frusto-conical projection having a lower opening 112 a portion of the distance from sidewall 103. Disrupting ring 111 and cover 106 define an air separation zone 113 within container 102. A frusto-conical shroud 116 surrounding a conical separation 117 shown in FIG. 4 is disposed on the axis of container 102 in zone 113. Ring 111 projects into cylinder 102 between about 20 to 50% of the annular distance between sidewall 103 and shroud 116. A coarse dirt collection region 114 is formed at the bottom of container 102 and is defined by a central column 118, sidewall 102 and bottom 104.

Dirty air enters assembly 101 through inlet 109 in sidewall 103 and enters tangentially along sidewall 103 in air separation zone 113. Disrupter ring 111 causes circulating air to be lifted off sidewall 103 and coarse dirt to be collected in outer collection region 114. Second stage fine dirt separation zone 125 shown in FIG. 4 is coaxially disposed in container 102 with center column 118 in which fine dirt particles are collected in a second collection region 119 defined by column 118 and bottom 104.

FIG. 4 is a cross-sectional view of second stage shroud 116 and cyclone 117. Shroud 116 and cyclone 117 are inverted frusto-conical in shape with a space 121 therebetween. Shroud 116 has a plurality of holes 120 (shown in FIG. 6) to allow air to enter space 121 between shroud 116 and the outer side of cone 117.

Cone 117 has a large upper cone opening 122 and a lower small cone opening 123. Similarly shroud 116 has a large upper cone opening 124 and a lower smaller cone opening 126 terminating at the top of central column 118. A gasket 127 is provided at the top of column 118 to isolate space 121 from collection region 119 and isolate the inner region of cone 117 from air separation air 113.

A plurality of inlet vanes 130 for feeding air to the interior of cyclone 117 are placed between shroud opening 124 and cone opening 122. Cyclone 117 is mounted on central column 118 by gasket 127. Shroud 116 is conical in shape and configured to fit over cyclone 117 and provide a passage for air to flow through holes 120 to vanes 130 before entering conical separator 117.

Cyclone 117 extends from the top of container 102 to a point about three quarters of the height of container 102 with large cone opening 122 at the top and small cone opening 123 at the bottom. A deflector plate 128 is mounted at small cone opening 123 supported by at least one rib 129.

Shroud 116 extends downwardly to gasket 127 that fits snugly into column 118. Gasket 127 includes an outwardly extending skirt 131 below disrupter ring opening 112.

FIG. 5 is an exploded view of assembly 101 showing cylindrical container 102, bottom 104, hinge 107, latch 108, shroud 116, inlet 109, and cover 106.

FIG. 6 is an exploded view of the elements of shroud 116 and conical separator 117. Vanes 130 are shown at top opening 122 of cone 117. Shroud 116 is assembled from four shroud plates 131 mounted on a shroud frame 138. Holes 120 in shroud plates are angled in the direction of air flow in separation zone 113 to facilitate passage into space 121. This also reduces collection of fine dirt on shroud 116 and in holes 120 of shroud 116 during operation.

Figure 7:
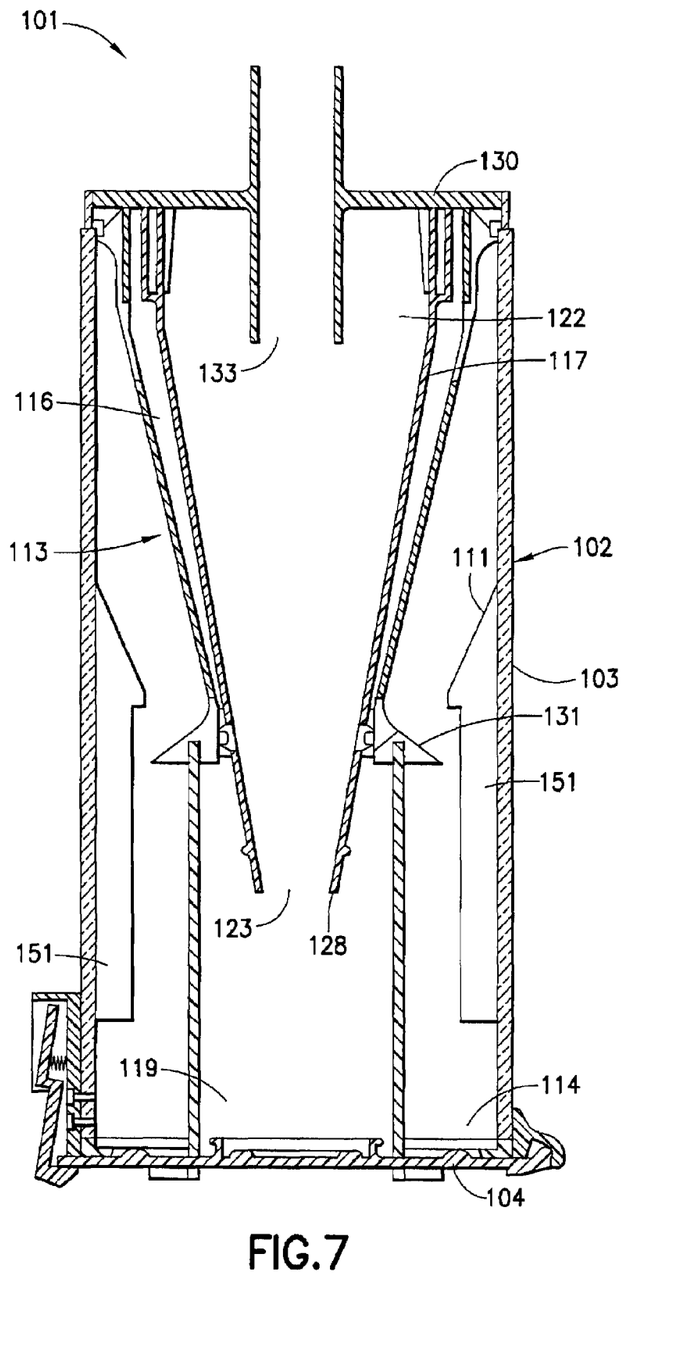
FIG. 7 is a cross-sectional view of an air separation and collection assembly as shown in FIG. 1 with vanes below the disrupter ring in accordance with another embodiment of the invention.

FIG. 7 is a cross-sectional view of a modification of assembly 101. Here, a plurality of vanes 151 are disposed on container wall 103 below disrupter ring 111. All the remaining elements of assembly 101 are present in this embodiment. Air entering the first stage separator rotates in space 113 between sidewall 103 and shroud 116 with large dirt particles passing through the space between ring 111 and skirt 131. These particles are collected on base 104 in region 114. Paddles or baffles may be placed on the inside surface of base 104 to prevent re-entrainment of dirt during operation of the separation device.

Air circulating in first stage separator zone 113 passes through holes 120 (shown in FIG. 6) in shroud 116. It then travels upwardly to a series of directional vanes 130 and is directed into a second stage frusto-conical separator 117 coaxially oriented within container 102. Second stage conical separator 117 has a large cone opening 122 at the top and a smaller cone opening 123 at the bottom. The separation elements may be oriented in any direction.

Air then rotates downwardly along the inside wall of cone 117 and then turns upwardly to exit through an outlet 133 and passes through exhaust or outlet conduits on the outside of vessel 102. Fine dirt is expelled through lower cone opening 123 and collected in collection zone 119 at the base of column 118. Exiting clean air then passes through a filter, such as a HEPA filter, to a suction source such as motor fan 6 in the vacuum cleaner of FIG. 1. A deflector plate 128 may be placed at the outside of small cone opening 123 to increase efficiency of the separation in conical separator 117.

In the embodiment illustrated in FIGS. 3-7, holes 120 in shroud 116 are angled at about 45°. The more tangential the angle, the better, but generally between about 30 to 75 degrees.

During operation coarse particles and fibers are separated from the dirty inlet air in first stage separator 113. These coarse particles are collected in the base of vessel 102. Fine dirt particles separated in second stage cyclonic separator 125 are collected in second stage collection zone 119.

Dirt separation and collection assembly 101 is interchangeable and usable with the type of vacuum cleaner as illustrated in FIGS. 1 and 2. In addition, assembly 101 may be used with a stick vacuum or a canister vacuum cleaner. Here, dirty air enters towards the middle to upper portion of vessel 102 and exits through cap 106 and is transported to motor fan 6 at the base of main body 1.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that as a matter of language, might be said to fall therebetween.

What is claimed is:

1. An assembly for separating and collecting dirt from an air stream, comprising:
    an elongated container having a substantially cylindrical sidewall, a bottom and a top;
    an inlet formed in the sidewall;
    a disrupter ring mounted on the inner surface of the sidewall to define a first stage separation zone between the top and the disrupter ring and collection zone below the disrupter ring;
    a second separation zone including a frusto-conical cyclone disposed coaxially within the first stage separation zone; and
    a shroud with a plurality of holes disposed over the second separation zone to direct air to the second stage separation zone.

2. The assembly of claim 1, further including a plurality of vanes disposed at the top of the shroud for directing air into the frusto-conical separator.

3. The assembly of claim 1, further including a central column positioned in the container about a smaller cyclone opening to define an outer coarse particles collection zone and an inner fine dirt particles collection zone.

4. The assembly of claim 1, wherein the holes in the shroud are angled in the direction of air flow through the shroud.

5. The assembly of claim 1, wherein the shroud is frusto-conical in shape.

6. The assembly of claim 4, wherein the holes are angled between 30 to 75 degrees.

7. The assembly of claim 1, further including a plurality of vanes positioned on the inside of the container below the disrupter ring.

8. The assembly of claim 1, wherein the disrupter ring is a short segment of an inverted frusto-conical cone.

9. The assembly of claim 3, wherein the column at the lower cone opening has an outwardly projecting skirt located below the height of the disrupter ring.

10. The assembly of claim 1, wherein the bottom is selectively openable to empty dirt collected in the container.

11. The assembly of claim 1, wherein the inlet is positioned in the sidewall at the height of the shroud.

12. A vacuum cleaner housing including a suction source and a dirty air inlet and having a cavity for receiving a dirt separation and collection container, the container comprising:
    an outer elongated container having a substantially cylindrical sidewall, a bottom and a top;
    an inlet formed in the sidewall;
    a disrupter ring mounted on the inner surface of the sidewall to define a first stage separation zone and collection zone below the disrupter ring;
    a second separation zone including a frusto-conical cyclone having an inlet opening larger than the opposed opening of the cone;
    the second stage separation zone disposed coaxially within the first stage separation zone;
    a shroud with a plurality of holes disposed over the second separation zone to direct air to the larger cone opening of the second stage separation zone.

* * * * *